July 24, 1962 J. H. AUER, JR 3,045,909

PULSED ULTRASONIC DETECTOR

Filed June 15, 1959 8 Sheets-Sheet 1

INVENTOR.
J.H.AUER JR.
BY
Forest B. Hitchcock
HIS ATTORNEY

INVENTOR.
J.H.AUER JR.
BY Forest B. Hitchcock
HIS ATTORNEY

July 24, 1962 J. H. AUER, JR 3,045,909

PULSED ULTRASONIC DETECTOR

Filed June 15, 1959 8 Sheets-Sheet 3

PULSE GENERATOR

TIME CONSTANT AND RINGING OSCILATOR

TIME CONSTANT AND INVERTER AMPLIFIER

ADJUSTABLE TIME CONSTANT AND GATE GENERATOR

INVENTOR.

J.H.AUER JR.

BY Forest B. Hitchcock

HIS ATTORNEY

PULSED ULTRASONIC DETECTOR

Filed June 15, 1959 8 Sheets-Sheet 4

INVENTOR.
J.H.AUER JR.
BY Forest B. Hitchcock
HIS ATTORNEY

July 24, 1962 J. H. AUER, JR 3,045,909

PULSED ULTRASONIC DETECTOR

Filed June 15, 1959 8 Sheets-Sheet 5

WAVEFORMS - VEHICLE

WAVEFORMS - NO VEHICLE

INVENTOR.
J.H.AUER JR.
BY Forest B. Hitchcock
HIS ATTORNEY

INVENTOR.
J.H.AUER JR.
BY Forest B. Hitchcock
HIS ATTORNEY

FIG. 9. VEHICLE DIFFERENTIATION
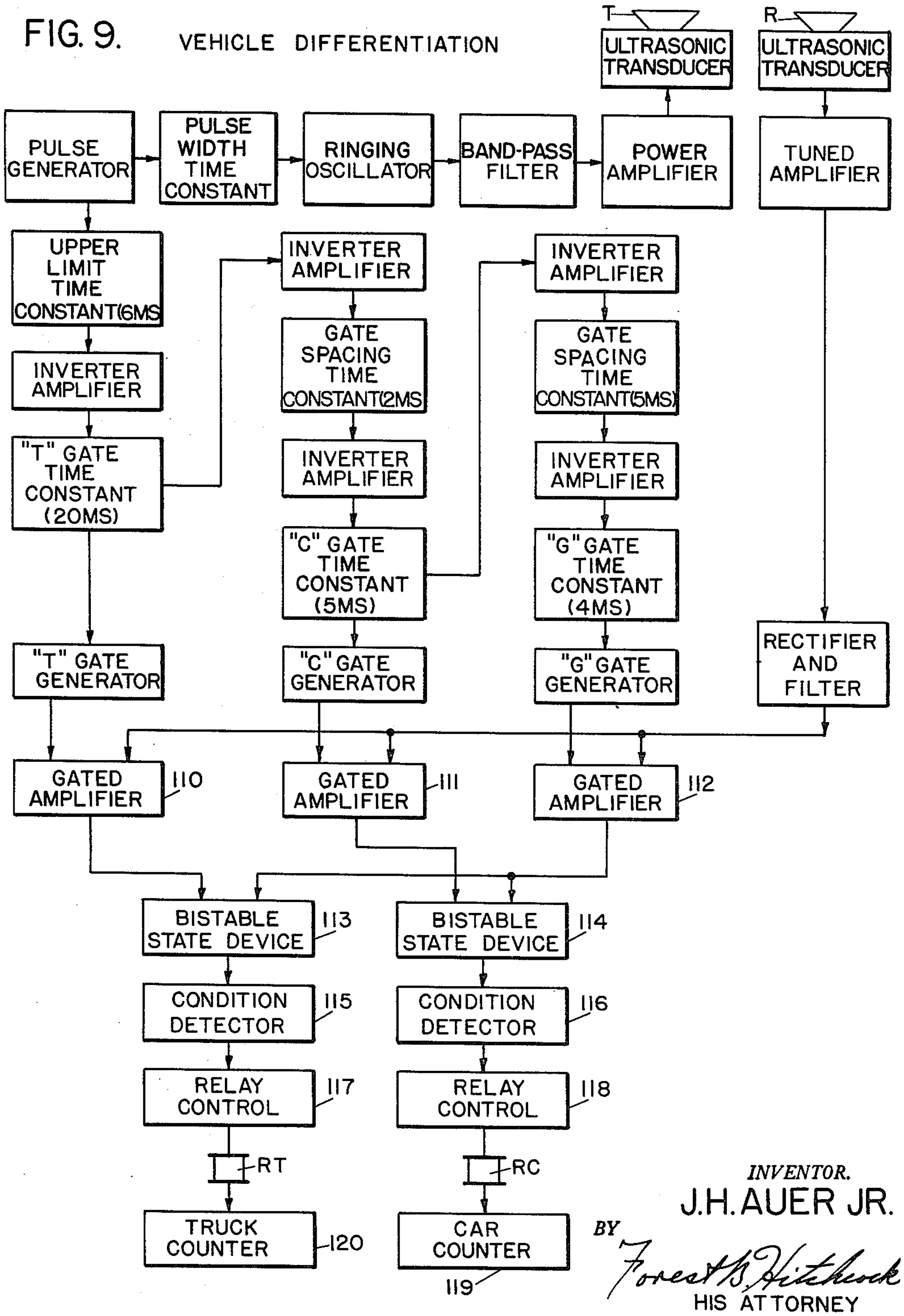
INVENTOR.
J.H. AUER JR.
BY Forest B. Hitchcock
HIS ATTORNEY July 24, 1962 J. H. AUER, JR 3,045,909

PULSED ULTRASONIC DETECTOR

Filed June 15, 1959 8 Sheets-Sheet 8

INVENTOR.
J.H.AUER JR.
BY Forest B. Hitchcock
HIS ATTORNEY

United States Patent Office 3,045,909
Patented July 24, 1962

3,045,909
PULSED ULTRASONIC DETECTOR
John H. Auer, Jr., Rochester, N.Y., assignor to General Railway Signal Company, Rochester, N.Y.
Filed June 15, 1959, Ser. No. 820,325
11 Claims. (Cl. 235—92)

This invention relates to the detection of objects by means of reflected ultrasonic energy, and, more particularly, relates to the detection and differentiation of vehicles or other randomly occurring objects traveling along defined paths by ultrasonic detection means.

At the present time there are several methods being utilized for purposes of detecting vehicles and counting highway traffic. These include, metal detectors, magnetic loops, photoelectric cells, pneumatic hoses, wheel actuated treadles, radar units, and infrared detectors. Each of these various methods of detection has certain drawbacks which limits its efficiency, effectiveness, or practicality. Most of these methods lack adequate discrimination between vehicles and human beings or animals or birds, others have relatively undefined zones of coverage which render it difficult to differentiate vehicles in separate traffic lanes. Some are rendered ineffective due to adverse weather conditions. While with some of these methods, the major problem is the relatively high cost of the equipment, in others, it is the high cost of installing and/or maintaining the equipment.

The invention disclosed herein, which is analagous in subject matter to and is to be regarded as being in the nature of an improvement over what is claimed and disclosed in the Kendall et al. application, Ser. No. 808,736, filed April 24, 1959, and assigned to the assigner of this application, meets the majority of these problems with a system that is both highly efficient and relatively inexpensive. A beam of ultrasonic energy is directed at a fixed reflecting surface, and the vehicles to be detected pass between the reflecting surface and the ultrasonic transmitter. An ultrasonic receiver (this can be same transducer used for transmission) is located adjacent to the transmitter and is sensitive to any refleced ultrasonic energy. By means of electronic gating circuits, ultrasonic pulses reflected from surfaces nearer the transmitter than the fixed reflecting surface are detected and differentiated. The detection of a vehicle requires the cutting-off of the pulses which are normally reflected from the fixed reflecting surface as well as the receipt of pulses reflected from a surface closer to the transmitter than the said fixed reflecting surface.

When used under certain circumstances, such as in a parking garage, where not only vehicles but people and animals are often passing through the detection area, the invention disclosed herein can be made insensitive to the people and animals while maintaining an accurate count of the passing vehicles. Also, the invention disclosed herein can be adapted to highway use whereby automobiles and trucks traveling at relatively high speeds can be accurately detected and differentiated.

It is an object of this invention to provide an ultrasonic system for the detection of objects passing a fixed point.

It is a further object of this invention to provide an ultrasonic system for the differentiation, in accordance with size, of objects passing a fixed point.

It is a further purpose of this invention to provide an ultrasonic system which can produce an accurate count of the vehicles passing a fixed point.

It is a further object of this invention to provide an ultrasonic system which shall count the vehicles passing a fixed point without counting the passage of people, birds, animals, etc.

It is a further object of this invention to provide an ultrasonic system which shall produce a single accurate count for each vehicle passing a fixed point regardless of the particular character of the vehicle or the number of its axles or wheels.

It is a further object of this invention to provide an ultrasonic system which can count the vehicles passing a fixed point and at the same time differentiate each of the passing vehicles in accordance with its relative size.

It is another object of this invention to effect improvements in the means employed in the aforesaid Kendall et al. application, Ser. No. 808,736, for differentiating between vehicles desired to be counted and other objects.

Other objects, purposes and characteristic features of the present invention will be in part obvious from the accompanying drawings, and in part pointed out as the description of the invention progresses.

For simplifying the illustration and facilitating in the explanation, the various parts and circuits constituting the embodiments of the invention have been shown diagrammatically and certain conventional elements have been left in block form, the drawings having been made more with the purpose of making it easy to understand the principles and mode of operation than with the idea of illustrating the specific construction and arrangement of parts that would be employed in practice. The symbols (+) and (—) are employed to indicate the positive and negative terminals, respectively, of suitable batteries, or other sources of direct current; and the circuits with which these symbols are used always have current flowing in the same direction.

In describing the invention in detail reference will be made to the accompanying drawings, in which like reference characters designate corresponding parts throughout the several views, and in which;

FIG. 9 is a block diagram of the invention used as a highway installation for counting the vehicular traffic passing a given point and for differentiating between automobiles and trucks; and, FIG. 10 illustrates by waveforms the spacing of the electronic gates in the circuit shown in block form in FIG. 9.

This specification shall discuss two basic applications of the invention herein. First, as exemplified by FIGS. 1A and 1B, the invention shall be considered in its application to a parking garage. The second basic application, exemplified by FIGS. 1C and 1D, is the use of the invention as a highway vehicle counter and differentiator.

PARKING GARAGE VEHICLE DETECTION AND COUNTING

Figure 1A:
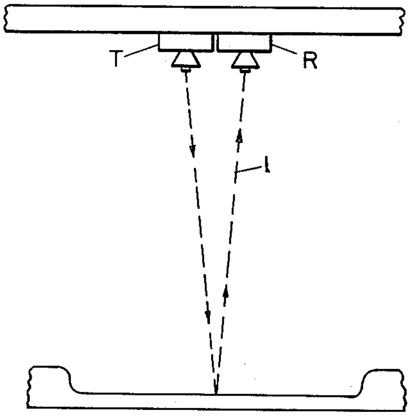
FIGS. 1A and 1B illustrate a possible arrangement of the transducers in relation to the vehicles to be detected when the system of this invention is to be used for vehicle counting in a ramp garage.
Figure 1B:
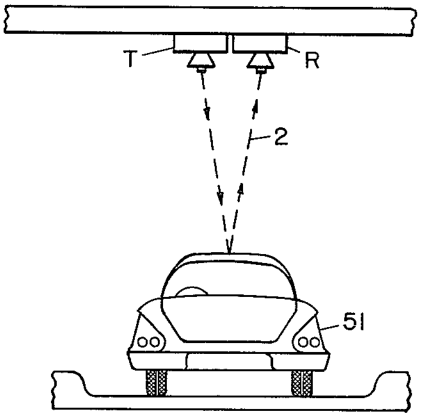
Figure 1C:
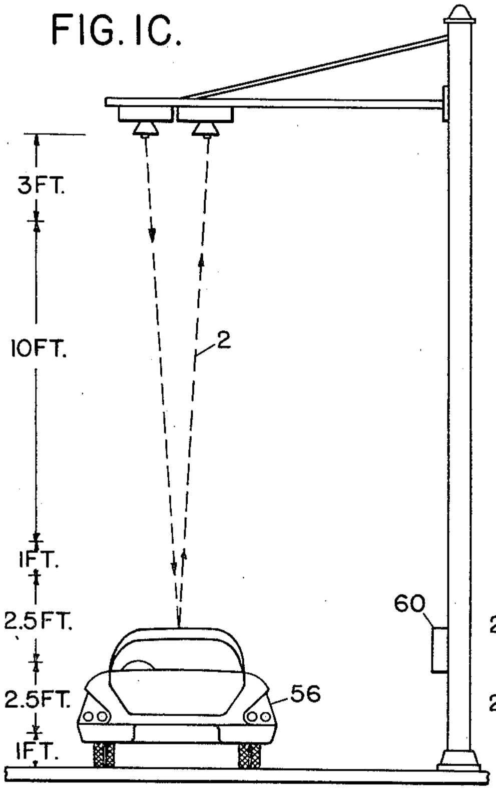
FIGS. 1C and 1D illustrate a possible highway adaptation of the vehicle differentiation unit, showing the relative distances marked out by each of the gating systems shown in FIG. 10.
Figure 1D:
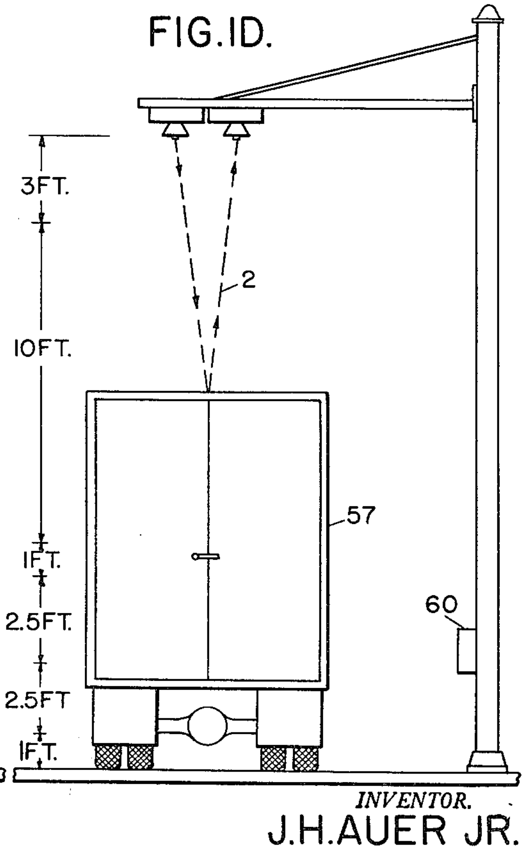

FIGS. 1A and 1B show two ultrasonic transducers as they might appear mounted over a detection lane (Entrance or Exit) of a large parking garage. With no vehicle present, as in FIG. 1A, ultrasonic waves 1 emanating from transmitting transducer T are reflected from the surface of the garage floor and picked up by receiving transducer R. When a vehicle 51 (FIG. 1B) passes through the detection area, it cuts off the normally present reflected floor wave 1, and receiving transducer R then picks up vehicle reflection wave 2. It is the combination of the loss of normally reflected wave 1 and the reception of vehicle reflected wave 2 and the further requirement that the normally reflected wave must again be received before another vehicle can be counted that permits the detection of the vehicle, as will be explained below in detail.

Figure 2:
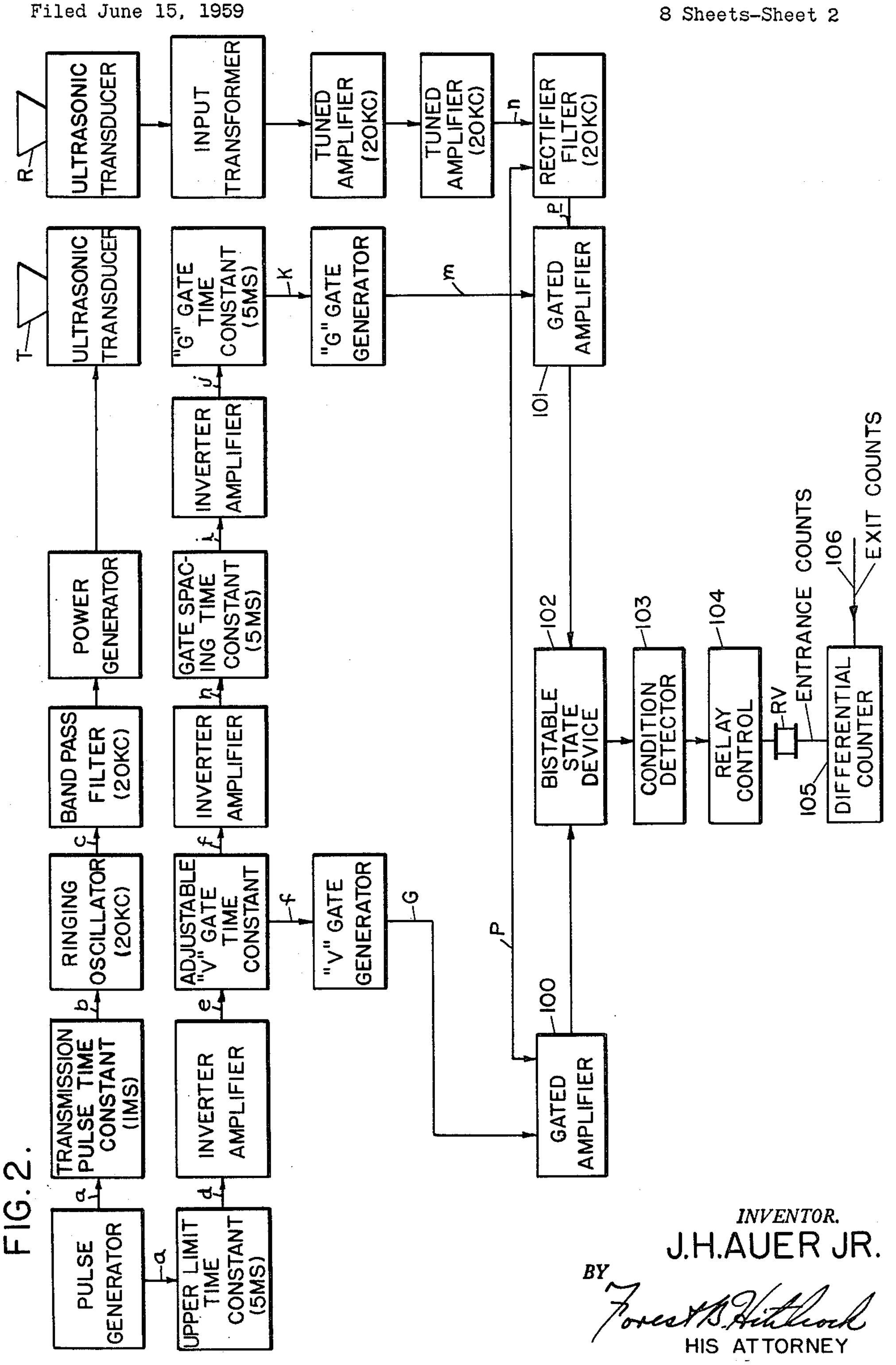
FIG. 2 is a block diagram of a preferred form of the invention used as a vehicle detection system in a parking garage.

FIG. 2 is a block diagram of the circuitry used in a preferred embodiment of the invention herein when applied as a vehicle detector at a place such as a large parking garage. In describing this circuitry in detail, reference will be made to FIGS. 3, 4, 5, 6, and 7 and to the waveforms set forth in FIGS. 8A, 8B and 8C.

ULTRASONIC TRANSMISSION PULSE GENERATION CIRCUITS

Figure 3:
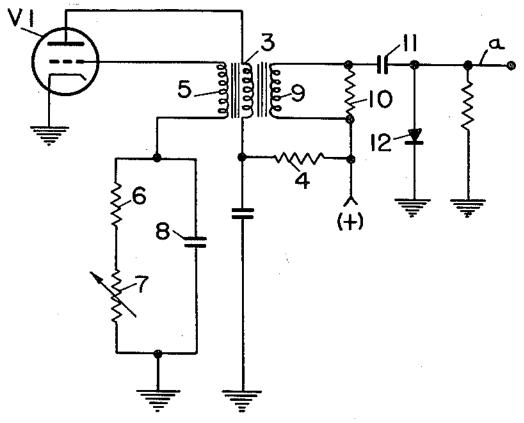
FIGS. 3, 4, 5, 6 and 7 are schematic diagrams of typical electronic apparatus that may be used to effect the function of the block diagrams illustrated in FIG. 2.

In the preferred embodiment of this invention, the Pulse Generator is a single swing blocking oscillator such as that shown in FIG. 3. Assuming that the grid of triode V1 has just risen above cut-off, triode V1 begins to conduct and plate current builds up through plate coil 3 and plate resistor 4, causing an increasing voltage drop over plate resistor 4 which is reflected in plate coil 3 as a negative-going pulse. This negative-going pulse in plate coil 3 induces a positive-going pulse in grid coil 5, and thus as the plate current builds up, the grid of triode V1 is driven further positive, causing a further build-up in plate current, and so on until triode VI reaches saturation. Since the grid of triode V1 is driven positive with respect to its cathode, the grid draws current through grid resistors 6 and 7, causing the build up of a negative potential across grid capacitor 8.

When triode V1 reaches saturation, the plate current levels off and no voltage is induced in grid coil 5. Triode V1 is then cut-off by the negative voltage that has been built up over grid capacitor 8, and the field around plate coil 3 starts to collapse. This induces negative potential in grid coil 5 and the grid of triode V1 is driven far below cut-off.

Triode V1 does not begin to conduct again until the negative charge on grid capacitor 8 has leaked off through grid resistors 6 and 7 sufficiently to once again raise the grid potential above cut-off, at which time the cycle repeats itself. It can be seen that by varying the resistance of grid resistor 7 it is possible to control the time it takes for the charge to leak from grid capacitor 8, thereby controlling the time between each single swing cycle of the oscillator.

Output coil 9 also responds to the changing field around plate coil 3, and the potential induced in it is reflected across resistor 10 as a positive pulse followed immediately by a negative pulse. While this cycle tries to pass through coupling capacitor 11, point *a* sees only the negative portion of this cycle (see waveform *a* in FIG. 8A) due to the rectifying action of triode 12. It is this short negative pulse that triggers the entire circuit, the time interval between trigger pulses being controlled, as explained above, by varying grid resistance 7.

The negative trigger pulses produced by the Pulse Generator are fed to the Transmission Pulse Time Constant (see FIG. 2) which controls the ultrasonic frequency Ringing Oscillator. It should be noted that the values assigned to the time constants which appear throughout the block circuits outlined in FIG. 2 are variables dependent upon the placing of the ultrasonic transducers in relation to the fixed reflecting surface being used in any particular application and upon the sizes of the objects to be detected. The values for these time constants shown in FIG. 2 are based upon the arbitrary assumption that the transducers have been mounted ten feet above the floor of a parking garage and that no vehicle higher than 7.5 feet need be detected. These timing circuits shall be covered more fully below.

It should also be noted at this point that, as used throughout this specification and the appended claims, the term "ultrasonic" refers to all wave motion produced by physical vibration (as distinguished from electromagnetic waves) at frequencies above the range of audibility for the human ear, that is, from 15,000 or 20,000 cycles per second and higher. Even though the frequencies employed are thus perferably in the "ultrasonic" range, it will readily be appreciated that the teachings of this invention are not intended to be limited to such values since the frequencies used may be in the audible range as well. For purposes of this disclosure, the apparatus of the invention has been arbitrarily shown as designed to operate at a frequency of 20 kc.

Figure 4:
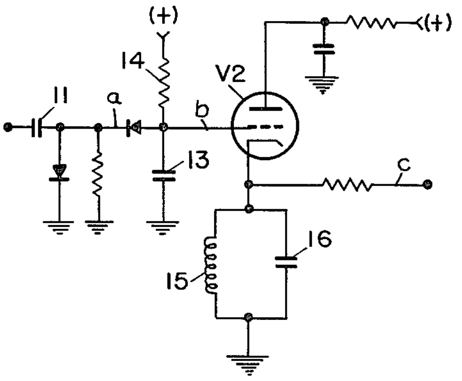
Figure 5:
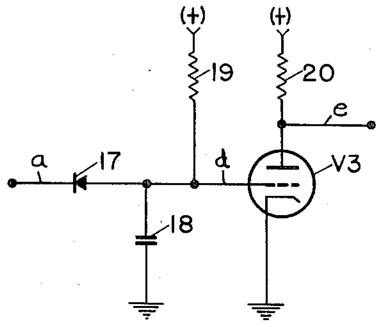

Referring now to FIG. 4, the negative trigger pulse which appears at point *a* places a negative charge across capacitor 13, driving the grid of triode V2 below cut-off, and this charge leaks off through resistor 14. This RC time constant is designed so that the negative voltage appearing at the grid of triode V2 remains below cut-off for one millisecond. (See waveform *b* in FIG. 8A.)

Triode V2 is normally conducting at a steady rate, passing a steady current flow through coil 15. However, when the negative trigger pulse appears at the grid of triode V2 (point *b*), triode V2 is suddenly cut-off causing the field around coil 15 to collapse which in turn induces the continued flow of current through coil 15. This current can no longer pass through triode V2 which is cut off, and so it charges up capacitor 16 which in turn discharges back through coil 15, and the tank circuit comprising coil 15 and capacitor 16 begins to oscillate at its resonant frequency. For purposes of this disclosure, it is assumed that values for coil 15 and capacitor 16 are such that the tank circuit has a resonant frequency of 20 kc.

This shock excited Ringing Oscillator tank circuit continues to oscillate, with some damping due to the resistance in the circuit, until the negative potential on the grid of triode V2 leaks off and triode V2 begins to conduct again, that is, for a period of one millisecond. The output of this tank circuit (waveform *c* in FIG. 8A) is fed through a Bank Pass Filter and Power Amplifier to transmitting Ultrasonic Transducer T which then transmits this one millisecond pulse of ultrasonic energy in the form of a beamed wave directed, for purposes of this disclosure, at the floor of the exit or entrance lane in which traffic is being detected and counted.

GATE TIMING CIRCUITS

The negative trigger pulse is also used to trigger the gate timing circuits shown in the second line of blocks in FIG. 2. The combinations of Time Constants and Inverter Amplifiers that make up this portion of the overall circuit are a consecutive series of circuits such as that illustrated in FIG. 5, the output of each Inverter Amplifier being used to trigger the next succeeding time constant. The negative trigger pulse appearing at point *a* draws instantaneous current through diode 17 and places a negative charge across capacitor 18 and on the grid of triode V3. This negative charge on capacitor 18 leaks off through resistor 19 at an exponential rate determined by the time constant associated with capacitor 18 and resistor 19. The first time constant, designated "Upper Limit" is designed (for purposes of this disclosure) to cut-off triode V3 for a period of five milliseconds each time capacitor 17 is charged by a negative trigger pulse. (See waveforms *a* and *d* in FIG. 8A). This Upper Limit time constant determines the maximum size of the vehicles which can be detected by the apparatus at any given location, as will be explained below.

Since triode V3 is normally conducting, there is a steady voltage drop over plate resistor 20. However, following each trigger pulse, triode V3 is cut off for a period of five milliseconds, as just explained above, and the resultant loss of plate current causes the voltage appearing at point *e* to jump up to the value of the (+) source. At the end of this five millisecond cut-off period, triode V3 once again conducts and the voltage drop over plate resistor 20 reappears, causing the voltage at point *e* to drop away to its original value. This resulting square wave output is shown in waveform *e* in FIG. 8A. The trailing edge of this square wave is used to trigger the next time constant.

Figure 6:
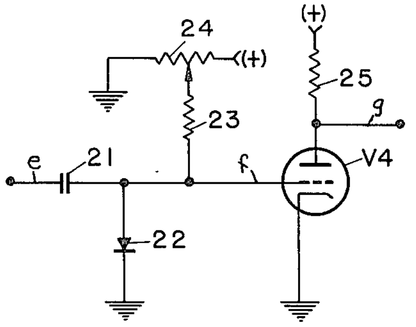

FIG. 6 is a schematic diagram of the Adjustable Time Constant and Gate Generator. When the voltage at point *e* rises during the positive going portion of the above described square wave, diode 22 conducts and charges capacitor 21, the grid of triode V4 remaining at approximately ground potential. However, when the voltage at point *e* drops away with the trailing edge of the square wave, this negative going drop is passed through capacitor 21 and appears at the grid of triode V4, driving the grid far below cut-off. In response to this negative potential, diode 22 appears as an open circuit, and the negative charge must leak off through resistor 23 and potentiometer 24. By varying the resistance of poentiometer 24, the voltage towards which capacitor 21 discharges can be increased or decreased. The higher this voltage becomes, the faster capacitor 21 discharges to the ground potential level set by 22. Thus, by varying potentiometer 24, it is possible to control the time it takes capacitor 21 to discharge up to ground potential which, in turn, controls the period during which triode V4 remains cut off. For purposes of this disclosure, values for capacitor 21, resistor 23 and potentiometer 24 are chosen so that triode V4 will remain cut off for a period of nine miliseconds. Waveform *f* in FIG. 8A shows this resulting voltage which appears at the grid of triode V4.

Since triode V4 is normally conducting, there is normally a steady voltage drop over plate resistor 25. However, this voltage drop disappears when triode V4 is cut off, resulting in the production of a nine millisecond high positive potential square wave at point *g* as shown by waveform *g* in FIG. 8A. This square wave provides the "vehicle" or "V" gate to which further reference shall be made below.

Figure 8B:
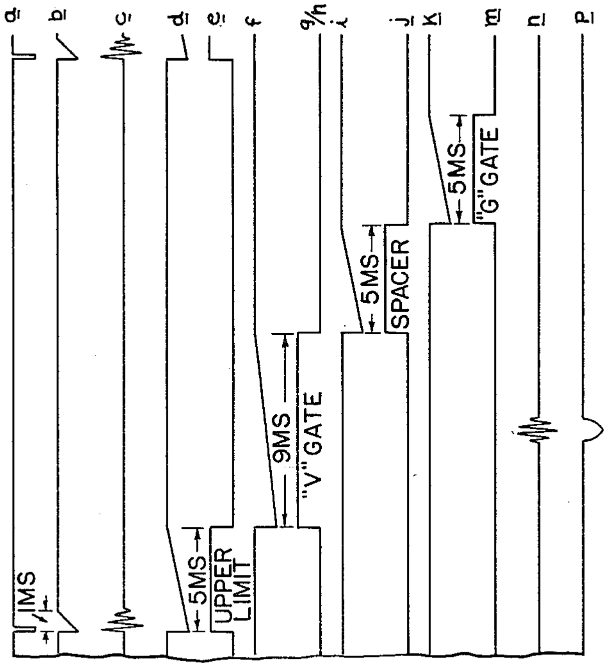
FIGS. 8A, 8B and 8C are typical waveform diagrams of voltages that may be found at various points in the overall circuit as illustrated in FIG. 2, showing the use of electronic gates to selectively differentiate between reflected pulses of ultrasonic energy.
Figure 8A:
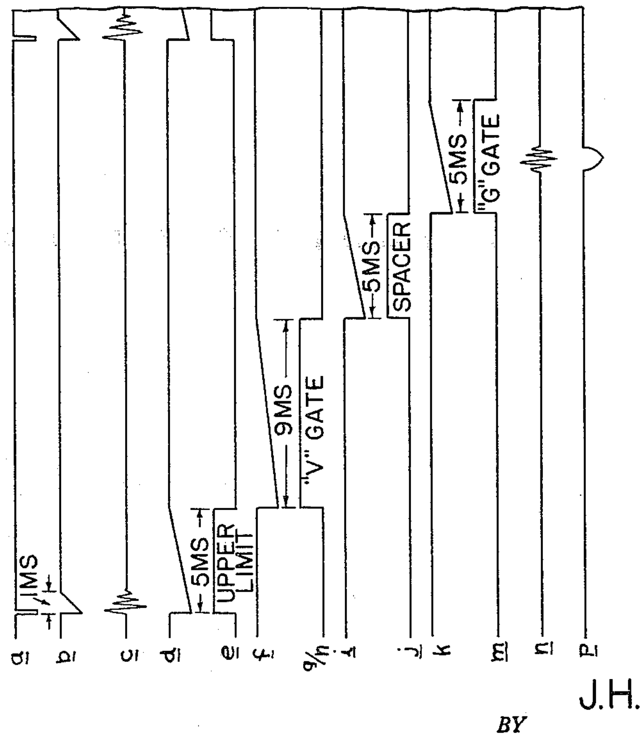

Returning again to FIG. 2, the Adjustable "V" Gate Time Constant output (shown as waveform *f* in FIG. 8A) is also fed to the grid of another Inverter Amplifier (see FIG. 5) resulting in a square wave output at its plate (waveform *h* in FIG. 8A). The trailing edge of this square wave is then used to trigger the Gate Spacing Time Constant and Inverter Amplifier circuits, which are similar to the circuits illustrated schematically in FIG. 5 and explained above, resulting in the production of respective waveforms *i* and *j* as shown in FIG. 8A.

And finally, the trailing edge of square wave output *j* triggers a second Time Constant and Gate Generator such as that illustrated in FIG. 6 and explained above. This results, respectively, in the production of waveforms *k* and *m* in FIG. 8A, square wave *m* providing the "ground" or "G" gate to which further reference shall be made below. It will suffice for the present to say that the various timing circuits are so adjusted with respect to the various time intervals which they demarcate that the "G" gate encompasses that interval of time following the transmission of each sound pulse during which a reflection would ordinarily be expected from the first reflecting surface which would be the ground or pavement as the case may be. Similarly, the "V" gate encompasses that portion of time within which a reflecting pulse from a vehicle would be expected at the receiving transducer. In this connection, it will be noted that the "V" gate is of considerably greater length than the "G" gate, the reason for this being, of course, that the distance from the transducers to the ground or pavement is fixed so that the pulse propagation time from the transmitting transducer to the ground and then back to the receiving transducer is a known quantity. On the other hand, the distance between the transducers and the top of a vehicle will naturally vary in accordance with the height of the vehicle, and the longer length of the "V" gate permits considerable variation in the propagation time for a pulse that is reflected from such vehicle top.

REFLECTED WAVE RECEPTION AND DETECTION CIRCUITS

Each pulse of ultrasonic energy beamed from transmitting transducer T, striking either the floor or some other reflecting surface, is reflected back to receiving transducer R. Referring to FIG. 2, each said reflected 20 kc. pulse received at receiving transducer R is converted by the transducer to a weak electrical signal of 20 kc. frequency. The voltage of this weak signal is first increased by an Input Transformer and then amplified twice by two successive Tuned Amplifier circuits. The output of the second Tuned Amplifier (see waveform *n* in FIG. 8A) is passed through a Rectifier Filter circuit which feeds the resulting negative pulse (waveform *p* in FIG. 8A) to the gated detection circuits which comprise Gated Amplifiers 100 and 101, Bistable State Device 102, Condition Detector 103, Relay Control 104, and the Relay RV which controls the application of an input to the Differential Counter 106.

From the above description, it is apparent that the Gated Amplifiers 100 and 101 each receive an input pulse from the Rectifier Filter for each reflection pulse picked up by the receiving transducer R, irrespective of whether the received sound pulse has been reflected from the ground or from a vehicle or other object to be detected. These two Gated Amplifiers 100 and 101 are gated respectively from the "V" Gate Generator and "G" Gate Generator. The gating thus provided is such that either of these amplifiers can produce an output pulse in response to an input pulse from the Rectifier Filter only if it is at that time also gated by its respective "V" Gate Generator or "G" Gate Generator. It follows from this, therefore, that the Gated Amplifier 100 will supply an output pulse to the Bistable State Device 102 only when the "V" Gate Generator is providing its high level of gating voltage as indicated at line G of FIG. 8A, and this means that such output pulse is, in effect, provided only in response to a pulse reflected from the top of a vehicle. In a similar fashion, the Gated Amplifier 101 provides an output pulse to the Bistable State Device 102 only for an input pulse received from the Rectifier Filter at the time that the "G" Gate Generator is providing its high level of output, and this means that such output pulse is provided only for a sound pulse that is reflected from the ground or pavement.

The Bistable State Device 102 has one stable state which may be designated as its "0" state to which it is operated whenever it receives a pulse from amplifier 101 and a "1" state to which it is operated by a similar pulse from amplifier 100. When in the "0" state, the device 102 supplies one distinctive kind of output to the Condition Detector 103 and a different distinctive output when it is in the "1" state. When the Condition Detector 103 has received the one distinctive output for some predetermined controllable time, it acts through the Relay Control 104 to cause relay RV to be dropped away. In other words, the continued reception of pavement reflections holds the device 102 steadily in its "0" state and the Condition Detector 103 senses this and causes relay RV to be dropped away. On the other hand, when the Condition Detector 103 has received the other kind of distinctive output for some predetermined time, it acts through the Relay Control 104 to cause relay RV to be picked up. This means that the continued reception of reflected pulses from a vehicle tend to insure that the device 102 remains steadily in its "1" state and a different kind of input signal is then received by the Condition Detector 103 so that it then acts through the Relay Control 104 to cause relay RV to be picked up.

When a vehicle or other object first intercepts the beam of transmitted repetitive sound pulses, there is a brief interval during which reflections may be received both from the pavement and from the vehicle. In that case, output pulses are provided alternately by both the Gated Amplifiers 100 and 101. The Bistable State Device 102 is then operated alternating between its "0" and its "1" conditions, and it then alternately provides first the one kind of output and then the other kind of output to the Condition Detector 103. As will be apparent from the detailed description to be given subsequently, it will be seen that the Condition Detector 103 is so organized that it will not change its control last exercised on the relay RV through the Relay Control 104 in response to such alternately different outputs from the device 102. For example, if the device 102 has for some time remained in its "0" state so that relay RV is dropped away according to the mode of operation outlined above, a change in conditions such that the device 102 is alternated rapidly between its two stable states will not affect the control provided by the Condition Detector 103 with respect to relay RV. In order for such control to be varied, it is necessary that the Bistable State Device 102 be operated to the "1" state and remain in that condition for some time which is controllable as desired before the Condition Detector 103 will change its control of relay RV and cause this relay to pick up.

With respect to the detection of vehicles or other objects, this general mode of operation has the following effect: If the relay RV is dropped away because only pavement reflections have been received, this relay will still remain dropped away throughout the interval that both pavement and vehicle reflections are received. It is only when pavement reflections are no longer received and only vehicle reflections are received that the relay RV will pick up and thereby provide an input count to the Differential Counter 105. Again as the vehicle recedes, there is a brief interval when once more both vehicle and pavement reflections are received. Although the device 102 will then rapidly alternate between its two possible states, the condition detector 103 will still maintain the relay RV picked up, and it is not until such time as only pavement reflections alone are received without any vehicle reflections, that the Bistable State Device 102 will remain in its "0" state so that the Condition Detector 102 can then cause relay RV to drop away.

Figure 7:
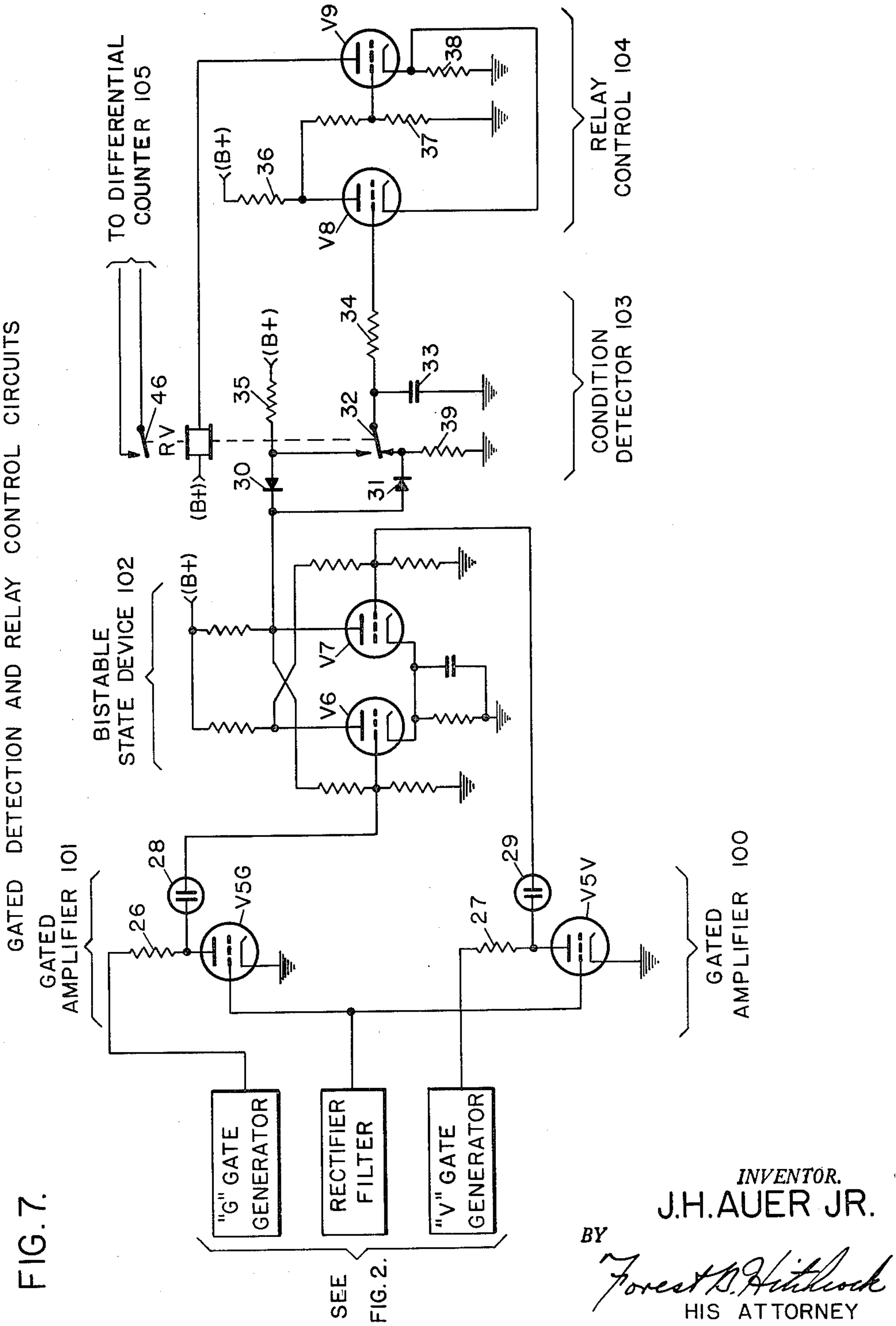

Reference will now be made to FIG. 7 which illustrates in detail the circuits which were provided in one specific embodiment of this invention to accomplish the desired results. In FIG. 7, each negative pulse (waveform *p* in FIG. 8A), corresponding to each reflected pulse of ultrasonic energy received by transducer R, is fed simultaneously to the grids of Gated Amplifier triodes V5G and V5V. The plates of these gating triodes are directly connected, through plate resistors 26 and 27, to the plates of their respective Gate Generators (see FIG. 6). Thus, Gated Amplifier triodes V5G and V5V pass effective plate current only during the periods when a high positive potential is placed upon their plates due to the cutting off of their respective Gate Generators (see waveforms *g* and *m* in FIG. 8A).

Assuming that a negative pulse appears at the grid of Gated Amplifier triode V5G at a time when this tube is conducting effectively, Gated Amplifier triode V5G will be momentarily cut off. During this momentary cut-off period, the voltage drop across plate resistor 26 will disappear, and the voltage at the plate of Gated Amplifier triode V5G will momentarily jump up to a high positive potential determined by the square wave output of the "G" Gate Generator. This pulse causes neon lamp 28 to break down momentarily so that a corresponding high amplitude positive-going pulse appears on the grid of tube V6 included in the Bistable State Device (see line F, FIG. 8C).

On the other hand, if a negative pulse appears at the grid of Gated Amplifier triode V56 during the time its plate is not receiving sufficient plate potential from the "G" Gate Generator, this negative grid pulse would not cause any noticeable change in plate output voltage or at the grid of triode V6.

Figure 8C:
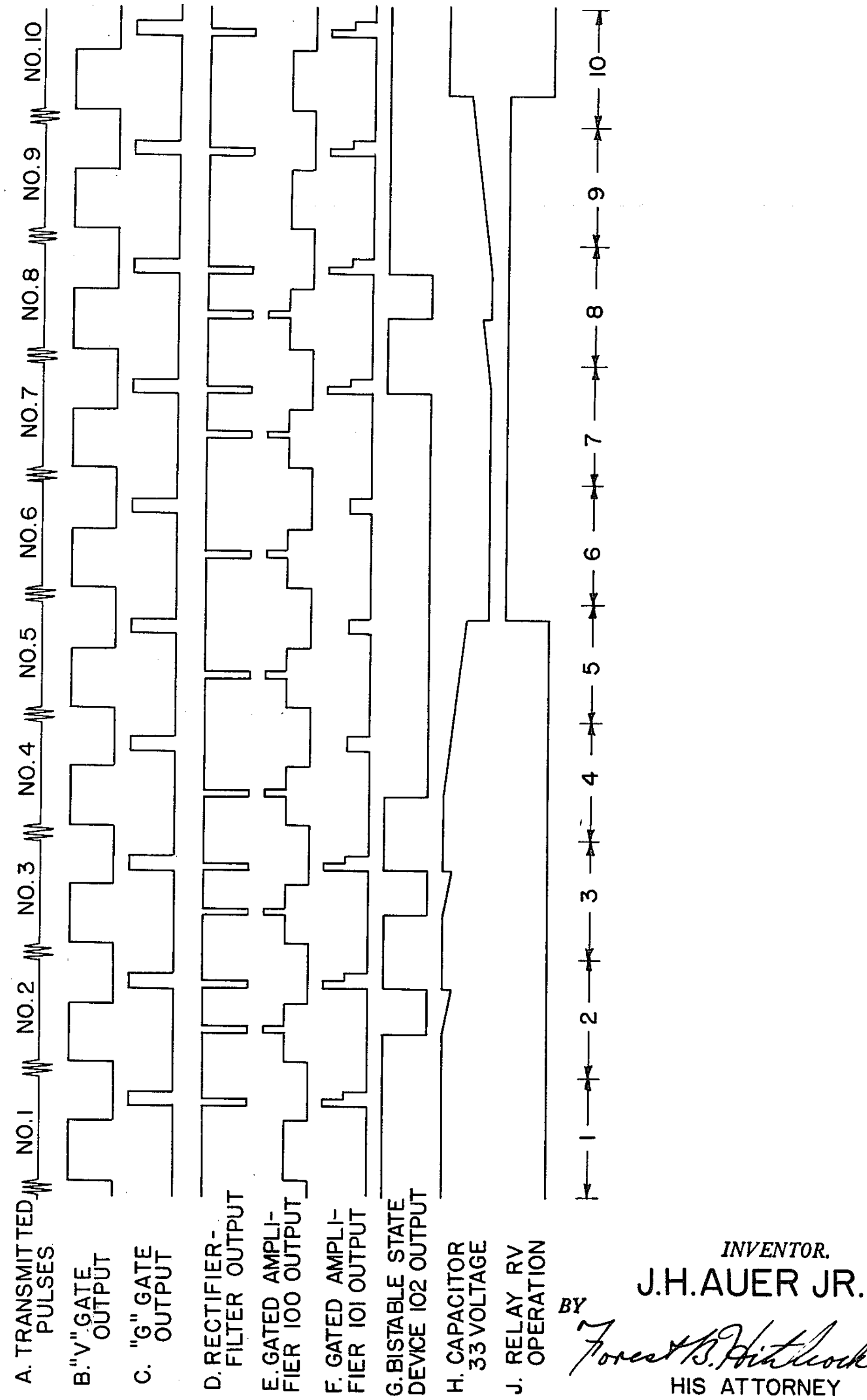

The description just set forth above of the operation of Gated Amplifier triode V5G also applies to the operation of Gated Amplifier triode V5V, the appearance of a negative pulse from the Rectifier Filter effectively producing a positive pulse at the plate of the tube V5V and the grid of the associated triode V7 only when Gated Amplifier triode V5V has its plate effectively gated by a positive "gate" potential (line F, FIG. 8C).

It should be noted that due to the operation of the timing circuits described above, Gated Amplifier triodes V5G and V5V are gated at different times. Thus, for any given negative pulse appearing simultaneously at their respective grids, only one of the gating triodes can pass a positive pulse to the grid of its corresponding triode tube V6 or V7.

From the general description previously given, it will be apparent that the grid of tube V6 receives a positive-going voltage pulse for each received sound pulse that is reflected from the ground or pavement, whereas the grid of tube V7 receives a similar positive-going voltage pulse for each sound pulse received that is reflected from a vehicle.

Tubes V6 and V7 are interconnected to provide a common type of bistable state electronic circuit. Thus, the tubes V6 and V7 each has its control grid coupled to the plate of the other so that one tube is at all times fully conductive and the other tube fully non-conductive. The last-operated condition is steadily maintained until a positive-going trigger pulse appears at the control grid of the then non-conducting tube to drive it momentarily to the conductive state at which time the relative conductive states of the two tubes abruply reverses.

Coupling between the tubes V5G and V5V to the respective tubes of the bistable state device 102 is effected by means of the neon lamps 28 and 29 respectively. Therefore, a positive-going voltage pulse at the plate of tube V5G momentarily so increases the voltage across the normally non-conductive neon lamp 28 that this lamp breaks down and provides a low resistance conductive path to the control grid of tube V6. Thus, the plate voltage pulse produces a corresponding positive voltage pulse at the control grid of tube V6. If the bistable state device 102 is then in the particular state in which tube V6 is non-conductive and tube V7 conductive, an abrupt reversal of the device will then occur so that tube V6 may become conductive and tube V7 non-conductive.

Whenever the device 102 is in the condition where tube V7 is conductive, the voltage at the plate of this tube is relatively low, whereas this voltage is considerably higher, and substantially equal to the (B+) voltage, when this tube V7 is non-conductive. The plate of tube V7 is connected through two coupling diodes 30 and 31 and through respective front and back contacts of relay RV to the grid circuit of tube V8. More specifically, the heel of the contact 32 is connected through a capacitor 33 to ground, and the upper terminal of this capacitor is connected through a resistor 34 to the control grid of tube V8. In addition, a connection is made from the front contact 32 of relay RV, through resistor 35 to the (B+) terminal, and the back contact is connected through resistor 39 to ground.

The operation of the condition detector 103 comprising the various elements described above is as follows: The status of the circuits as shown in FIG. 7 is the normal one when no vehicle is present so that reflections are received only from the ground. Under these circumstances, a positive-going voltage pulse is generated at the plate of tube V5G once each cycle. Each of these positive-going pulses is applied to the control grid of tube V6, and this insures that the Bistable State Device 102 is steadily in the condition where tube V6 is conductive. With no vehicle reflections received, there can be no positive-going pulses provided by tube V5V and thus no pulses on the grid of tube V7 tending to operate the device 102 to the opposite state. With tube V7 thus continually non-conductive, its plate voltage is at a high level and this high plate voltage is applied through rectifier 31 in its forward or low resistance direction and through the back contact 32 of the normally de-energized relay RV to the upper terminal of capacitor 33. As a result, this capacitor 33 is charged to a high positive voltage such that the grid voltage of tube V8 is sufficiently positive to cause this tube to be fully conductive. The large voltage drop that then occurs across the plate resistor 36 causes a relatively low grid voltage to appear on the grid of tube V9. Although the grid voltage of tube V9 must still be above ground because the grid of this tube is connected through resistor 37 to ground, tube V9 is nevertheless cut off under these circumstances because of the cathode bias it receives as a consequence of the flow of tube V8 plate current through its cathode resistor 38. With tube V9 cut off, the relay RV is deenergized.

If it is now assumed that a vehicle or other object is just starting to intercept the beam of repetitive sound pulses, then, as described above, both the tubes V5G and V5V will alternately supply positive-going plate pulses through their respective neon lamps 28 and 29 to the control grids of tubes V6 and V7. The device 102 will then be shifted alternately from one stable state to the other and for each transmission cycle the tube V7 will be for a time in the conductive state and also for a time in its non-conductive state. This means that the plate voltage of this tube will alternately rise and fall rapidly. When the plate voltage of tube V7 drops upon tube V7 becoming conductive, this drop can have but little effect upon the highly positively charged capacitor 33 since any discharging current encounters the high back resistance of rectifier 31. Capacitor 33 can therefore lose only a very minute portion of its positive charge during the interval that tube V7 has a low plate voltage through the long time constant discharge path provided through resistor 39. On the other hand, each time that the plate voltage of tube V7 is restored to its normal high value, any positive charge which was lost is quickly restored since a low resistance charging path is then provided through the forward direction of rectifier 31. From this it will be apparent that when capacitor 33 has been positively charged and has been effective thereby to cause relay RV to drop away, any subsequent conditions which result in an alternation in states of the device 102 will not have any appreciable effect upon the charge of capacitor 33 and thus the relay RV will remain dropped away.

If it is now assumed that the vehicle is fully within the beam of the transmitted sound pulses, it is then apparent that positive-going pulses can no longer be obtained from tube V5G since reflections from the ground or pavement are then precluded. At such itme, however, successive positive-going pulses are provided by the plate circuit of tube V5V, one for each transmission cycle. Only tube V7 in the device 102 then receives positive-going pulses so that the device then is maintained steadily in the condition where tube V7 is conductive and tube V6 is non-conductive. The plate voltage of tube V7 then remians at a low value and the capacitor 33 then discharges. Because of the relatively high resistance of resistor 39, this discharging does not occur immediately but requires that the plate voltage of tube V7 remain at the low value for some predetermined time dependent on the time constant for the discharge of this capacitor. The length of time required for this discharging of capacitor 33 can, of course, be suitably controlled by the insertion of more or less resistance in the discharging circuit. After the predetermined interval, the capacitor 33 has finally discharged sufficiently that the plate voltage of tube V8 will rise by reason of reduced conduction of this tube to a point where the cathode bias of tube V9 is overcome. At such time, tube V9 will become conductive and pick up the relay RV included in its plate circuit. The picking up of relay RV closes its front contact 32 so that the capacitor 33 has its upper terminal now connected through this front contact 32 and through rectifier 30 in the forward direction to the plate of tube V7. The capacitor 33 is then also connected through resistor 35 to the (B+) voltage source. A lower resistance discharging path is now provided for capacitor 33 which tends to maintain the capacitor voltage at some selected value near that of the plate of tube V7. With this low voltage at the upper terminal of capacitor 33, tube V8 is cut off, and its resulting high plate voltage continues to hold tube V9 conductive and relay RV picked up.

As the vehicle continues along its way and finally starts to pass out of the beam of the sound pulses, the condition is finally again reached where both pavement and vehicle pulses are received alternately and the device 102 again operates successively between its two opposite conditions. When tube V7 becomes non-conductive each time, its plate voltage rises and is then no longer effective to hold capacitor 33 discharged. The high back resistance provided by rectifier 30 tends to prevent the charging of capacitor 33 from the plate of tube V7. For this reason, an alternate charging path for capacitor 33 is provided through resistor 35 which connects to (B+). Thus, each time that tube V7 becomes momentarily non-conductive, capacitor 33 tends to charge positively but the amount by which it can thus become charged is limited by the relatively high resistance charging path provided through resistor 35. On the other hand, whenever tube V7 again becomes conductive, the capacitor 33 is again quickly discharged through rectifier 30 in the forward direction. The alternating condition of the device 102 then has no substantial effect upon the charge of capacitor 33 since this tends to remain at a low level with the result that relay RV remains picked up.

However, when conditions are such that tube V7 is once more restored to the non-conductive state where its plate voltage is at a high level, the capacitor 33 can then charge through resistor 35 and the grid voltage of tube V8 is then likewise increased until finally it reaches the level where tube V6 has its plate voltage reduced to the level where tube V9 will no longer be able to maintain relay RV picked up.

From this description, it is clear that the circuits of FIG. 7 operate in the manner previously described in a general fashion with respect to the block diagram of FIG. 2. To summarize: When only pavement reflections are received, device 102 is held in the condition where tube V7 is non-conductive, the capacitor 33 is fully charged, and relay RV is dropped away. On the other hand, the reception of vehicle reflections only causes tube V7 of the device 102 to be fully conductive so that capacitor 33 has then only a very small positive charge with the result that relay RV is picked up. The reception of both vehicle and pavement pulses alternately causes the device 102 to alternate between its two respective stable states and then the capacitor remains essentially in the condition it previously had with the result that the relay RV then also is maintained in its previous state.

Differential impulse counter 105 is the two-coil type well known in the art. Each time a circuit is closed to one of its coils as by closure of contact 46 of relay RV, an armature is picked up and causes a unit rotation of a counting drum in one direction, while the closing of a circuit to its other coil, causes the counting drum to rotate one unit in the opposite direction. The circuit to each coil must be opened between counts to allow the armature to be repositioned. Thus, differential impulse counter 50 will give only one count each time the above described detection circuit is closed.

It is assumed that the circuit just described has its transducers mounted over the Entrance Lane of the parking garage, and it is further assumed that the output of a similar circuit (not shown), with transducers mounted over the Exit Lane of the same parking garage, is fed to differential impulse counter 50 through line 49. In this way, an accurate count can be maintained as to the number of available parking spaces within the garage at any given time.

OPERATION OF PARKING GARAGE VEHICLE DETECTOR AND COUNTER

Referring once again to FIGS. 1A and 1B, it is assumed that transducers T and R are mounted ten feet above the floor of the traffic lane which is being monitored. To avoid the unnecessary use of small fractions, the speed of sound will be considered to be the close approximation of 1,000 feet per second, or, as is more pertinent to this disclosure, one foot per millisecond. It is obvious that the transit time required for each pulse of ultrasonic energy transmitted by transducer T to reach the floor and be reflected to transducer R is approximately twenty milliseconds, and assuming also that vehicle 51 in FIG. 1B is five feet high, each pulse of ultrasonic energy reflected from the top of vehicle 51 is received at transducer R approximately ten milliseconds after its transmission from transducer T.

Under normal conditions, the Pulse Generator is adjusted for a pulse repetition rate of about thirty pulses per second. (This adjustment is made, as explained above, by adjusting potentiometer 7 in FIG. 3.) At this rate, a pulse is transmitted by transducer T every 33 milliseconds, and, when no vehicle is present in the detection lane, a reflected pulse is received at transducer R approximately twenty milliseconds after each transmission.

Referring now to FIG. 8A, it can be seen that during the twenty millisecond lapse between the transmission of a pulse and the reception of its reflection (*n*) from the floor, the timing circuits have marked off the five millisecond Upper Limit, the nine millisecond "V" Gate, the five millisecond Spacer, and approximately one millisecond of the five millisecond "G" Gate. Thus, the reflected ground wave appears at the grids of Gated Amplifier triodes V5G and V5V (FIG. 7) at a time when triode V5V has substantially no plate voltage and triode V5G is supplied with plate voltage and is conducting, resulting in a negative pulse at the plate of tube V5G but not at the plate of tube V5V. As long as no vehicle is present, the negative pulses appear at the plate of tube V5G thirty times each second, but none appear at the plate of V5V and, as explained above and shown in FIG. 8C, this results in the cutting off of relay control triode V9, causing relay RV to remain dropped away.

When vehicle 51 is in the detection lane (FIG. 1B) so that the floor reflection is cut-off, transducer R now receives a reflection only from the top of vehicle 51. As can be seen from FIG. 8B, this new reflection (*n*) is received approximately ten milliseconds after each transmission and arrives during the "V" Gate period marked off by the timing circuits. This results in the production of the series of negative-going pulses at the plate of tube V5V but none at the plate of tube V5G so that, as described above, capacitor 33 discharges, permitting triode V9 to conduct and pick up relay RV.

Therefore, with the passage of a vehicle through the detection lane, relay RV picks up, closing front contact 46 (FIG. 7), and a circuit is completed to differential impulse counter 105, detecting and counting the passage of the vehicle.

After the vehicle has passed, the transmitted pulses are once again reflected from the floor and received during the "G" Gate time period, and the circuit returns to its normal status with relay RV dropped away. It should be particularly noted that it is required that the vehicle reflections cease and the ground reflections again have been received for some predetermined interval before relay RV can release so that it can again be picked up for a subsequent vehicle and a count supplied to Differential Counter 105. The significance of this requirement will become apparent from the description that follows.

It should be noted that a pulse reflected in less than five milliseconds would arrive during the Upper Limit period and would not cause a response in either of the gating circuits, since both gating triodes are without effective plate potential at this time. Also, the same is true of reflected pulses received between fourteen and nineteen milliseconds after transmission time, that is, during the Gate Spacer period. Due to the effect of these non-responsive periods, vehicles higher than seven and one half feet, that is, within two and one half feet of the transducers (less than five millisecond transit time for each pulse), and lower than three feet, that is, more than seven feet from the transducers (pulse transit time greater than fourteen milliseconds), will not be detected by the apparatus. These limits have been arrived at arbitrarily, and it should be obvious that they can be varied merely by varying the particular time constants involved.

SPECIAL FEATURES OF DETECTION CIRCUIT a. *Discrimination of Persons, Animals and Birds*

One of the problems presented by many of the presently utilized vehicle detection devices is that they are responsive to persons and animals as well as vehicles. This problem is particularly vexing in places such as parking garages where there is considerable pedestrian traffic, and even some animal traffic, along with the vehicular traffic being monitored. The invention herein overcomes this problem in part merely by its very nature, because the clothing and hair of humans and the fur and feathers of animals and birds absorb rather than reflect the pulses of ultrasonic energy beamed into the traffic detection lane. Also, the area covered by a person is generally much smaller than the floor area which reflects the transmitted beam of ultrasonic energy, and thus, the presence of a person in the detection area generally does not cut-off the normal ground reflection. However, the invention herein does not rely solely on these phenomena, since some people passing through the detection zone may be carrying packages or wearing hard objects which will reflect some ultrasonic energy as they walk by.

Assuming that persons carrying or wearing reflective objects succeed in cutting off the normal ground reflection, they are still discriminated from vehicles by this invention either on the basis of the short time, relative to vehicles, required for them to pass through the detection zone, or on the basis of the sporadic nature of the reflections received from them.

More specifically, if a person walks through the detection zone at a fairly fast rate so as to provide an occasional "vehicle" reflection and cut off the ground reflection for only a short period or sporadically, the Bistable State Device 102, which has up till now had its tube V7 steadily nonconductive, will alternate between its two states sporadically. It will not remain with its tube V7 conductive for a sufficiently long time to permit capacitor 33 (FIG. 7) to discharge sufficiently to allow the voltage at the grid of relay control triode V9 to rise above cut-off. Thus, relay RG will remain dropped away and the detection circuit to differential impulse counter 105 will remain open at front contact 46

Thus, a person carrying or wearing reflective objects and passing through the detection lane, will not be counted as a vehicle, and the count of vehicles within the garage will remain unchanged.

b. *Convertible (Fabric Top) Compensation*

While the fact that certain materials absorb rather than reflect ultrasonic energy helps to assure that people and animals will be discriminated from vehicles by this invention, this same fact raises a particular problem in the case of convertibles and other vehicles with fabric tops.

More specifically, the normal ground reflection is first cut-off by the metal hood of the car, and the hood then also provides a vehicle reflection. After this, however, the cloth top moves into the path of the sound pulses and no reflection is then received by the receiving transducer R because of the sound-absorbing qualities of the cloth. Still later, vehicle reflections are again received from the trunk of the receding vehicle. Obviously therefore, a convertible car would be erroneously counted as two vehicles if only the onset of a separate train of vehicle reflections were required to produce a vehicle count. However, it will be recalled that the relay RV, when once picked up, is dropped away again only when the pavement reflections and no vehicle reflections have been received for some particular interval. This means that a second picking up of this relay cannot occur from reflections off the trunk of the convertible since the relay will not have been dropped away when the cloth top passed through the path of the sound pulses.

The circuitry just described assures that any single vehicle will only be detected once, that is, it will cause only one impulse to be sent to differential impulse counter 105, even though its construction is such that during a single passage through the detection line it causes more than one separate and distinct set of reflected pulses to be received by transducer R.

c. *Multiple Traffic Flows Checked From Single Central Office*

One of the particular advantages of the invention herein is its economy and convenience of operation. In a parking garage having several floors and several distinct parking areas, traffic in each area can be detected and counted at a single central location. Each particular area to be monitored is furnished with transmitting and receiving transducers mounted over its entrance and exit lanes. All of the transmitting transducers in the garage can be connected in parallel to a common transmitter. Each receiving transducer may be connected via shielded cable to a corresponding receiver, the entrance and exit receivers for each area being connected to a differential impulse counter as explained above. All of these units, that is, the common transmitter, the receivers and their relays, and the counters can be located in a central office and operated from a common power supply, thereby consolidating all electronic equipment in one location with consequent ease of maintenance and cost reduction through the exploitation of common equipment.

The transmitting transducers may be a considerable distance from the common transmitter and each receiving transducer may similarly be located a considerable distance from its associated receiving unit.

HIGHWAY VEHICLE DETECTION AND DIFFERENTIATION

Another application for the invention herein is in the detection and counting of highway traffic. When utilized for this purpose, a single detection unit can differentiate between cars and trucks, keeping a separate and accurate count of both. Such a unit is shown in FIGS. 1C and 1D, with its transducers T and R mounted about twenty feet above the highway and connected by cable to an equipment box 60 containing all of the electronic apparatus.

FIG. 9 is a block diagram of the electronic components of the highway traffic detection unit. The transmission and reception circuits of this unit are identical to those of the parking garage unit explained in detail above. The components of the timing circuits, that is, the Time Constants, Inverter Amplifiers and Gate Generators, are similar to those explained above and shown schematically in FIGS. 3, 4, 5 and 6, and the gated detection circuits are similar to the circuits shown in FIG. 7.

Figure 10:
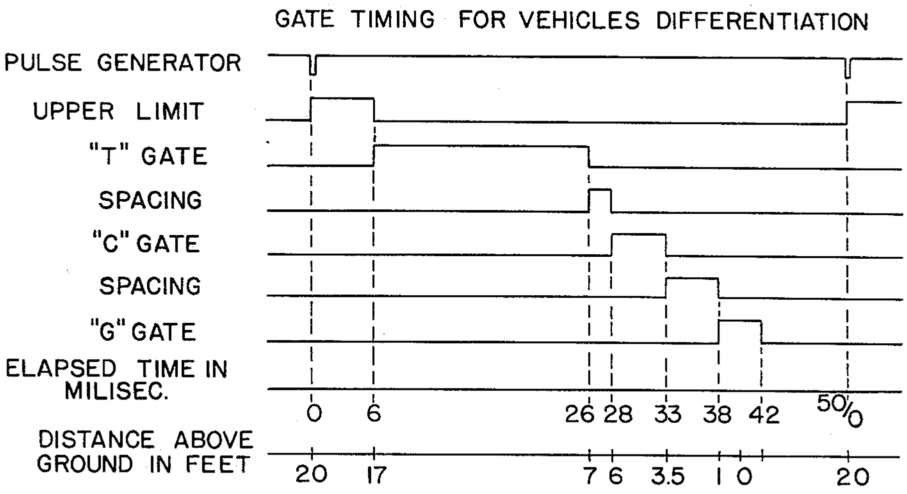

By comparing FIG. 9 with FIG. 2, it can be seen that the highway detection unit has the same basic circuitry as the parking garage unit with the addition of a third gate and associated gated detection circuit, and with certain changes in the values of the RC time constants of the timing circuits. The gate timing circuits may be designed to establish gates for pulses reflected from surfaces within various zones, such as those marked out in FIGS. 1C and 1D. FIG. 10 shows a series of waveforms taken at the plates of the various gating and gate-spacing triodes, illustrating the time relationships between the various gating potentials.

The operation of the three gated detection circuits is similar to that explained above in conjunction with the parking garage detection unit. A reflected pulse, applied simultaneously to the grids of all three Gated Amplifiers 110–112, can be amplified and passed on only by the particular Gated Amplifiers which is then gated "on." At any particular time when one of the Gated Amplifiers is "on" the other two Gated Amplifiers are effectively cut-off due to insufficient plate potential. The reception of a succession of reflected pulses during any particular gating period builds up a negative potential at the grid of the associated Relay Control triode, cutting off that triode and causing its associated relay to drop away.

Referring now to FIG. 10, the normal ground reflection arrives forty milliseconds after each transmission pulse (the transducers are mounted twenty feet above the roadway), and the timing of the various gates is so selected that the "G" gate will encompass the expected reception time of such normal ground reflection so that each pulse reflected from the ground appears during the "on" portion of the "G" Gate.

When car 56 (FIG. 1C) passes through the detection zone, the normal ground reflection is cut-off. Assuming car 56 to be five feet high, the top of car 56 is fifteen feet from the transducers, and pulses of ultrasonic energy reflected from its surface are now received approximately thirty milliseconds after each transmission pulse. The time of occurrence of the "C" gate (see FIG. 10) is so selected that pulses reflected from the top of car 56 arrive during the "on" period of the "C" Gate.

Likewise, the passage of truck 57 (FIG. 1D) cuts off the normal ground reflection and causes reflected pulses to be received sixteen milliseconds after each transmission pulse (assuming top of truck 57 to be twelve feet above ground and eight feet from the transducers). These pulses reflected from truck 57 arrive during the "on" period of the "T" Gate.

From the description given above, it is thus apparent that under the normal circumstances where no vehicle is present, negative-going voltage pulses will be produced in succession, one for each transmission cycle, by the gated amplifier 112, and each such pulse will represent a reflection from the ground or pavement. Similarly, when a car is within the beam of transmitted sound pulses, the gating amplifier 111 will produce a succession of negative-going output pulses; and the gated amplifier 110 will produce such output pulses when there is a truck or other higher vehicle within the beam of the transmitted sound pulses.

The output pulses of the amplifier 112 are applied to both the Bistable State Device 113 and the Bistable State Device 114. The effect of such pulses is the same as was described in connection with FIGS. 2 and 7 in that these pulses will tend to maintain the device 113 and 114 in a particular one of their two bistable states which may be designated as the "0" condition of the device. In response to this situation, the two Condition Detectors 115 and 116 respectively associated with the devices 113 and 114 will detect the fact that these respective devices are steadily in their "0" states and will then act upon the respective Relay Controls 117 and 118 so as to maintain the relays RT and RC both deenergized.

If it is assumed that a car now intercepts the beam of pulses, then the Gated Amplifier 111 will produce negative-going output pulses, and if the ground reflections are then completely cut off, output pulses will no longer be provided by the Gated Amplifier 112. Under these circumstances, the Bistable State Device 114 will be operated to its opposite or "1" state and remain in such condition. The capacitor associated with the Condition Detector 116 (see FIG. 9) will detect the fact that the device 114 is in the opposite state by becoming discharged to a considerably lower positive voltage so as to permit the Relay Control 118 to pick up relay RC so that a count may be added to that recorded by the Car Counter 119. In exactly the same way as was described in connection with FIG. 7, the occurrence of reflections from both the ground and a car for an interval will cause the device 114 to alternate rapidly between its two opposite states, but this will not have any substantial effect upon the Condition Detector so that it will still act upon the relay control 118 to hold relay RC deenergized. It is only when the ground reflections have been cut off for some time and vehicle reflections have been received from a car that the Condition Detector will act to cause the relay RC to pick up.

By analogy with the description just given, it will be equally apparent that the cutting off of the ground reflections concurrently with the occurrence of reflections from a truck will cause the device 113 to be operated from its normal or "0" state to its "1" state, and when this condition has persisted for some predetermined interval, the Condition Detector 115 will establish this fact and act upon the Relay Control 117 so as to pick up relay RT and supply an additional count to the Truck Counter 120. Both the means provided for the control of relays RT and RC respectively are so organized that the relays, when one is picked up, can be restored only when only ground reflections have again been received for some time with no reflections received from either a car or a truck. This requirement provides the novel discriminator features referred to above by ensuring that a subsequent vehicle cannot be counted until the previously counted vehicle has entirely cleared the beam of sound pulses so that the ground reflections and those alone are received by the receiving transducer.

Due to the shorter transit time through the detection zone of vehicles on a highway, as compared to vehicles in a parking garage, it is necessary that the highway detection circuits respond faster. It will be recalled that in the detection circuits explained above in regard to the parking garage units, separate charging and discharging circuits were provided for the capacitor 33. More specifically, if it is assumed that the Bistable State Device 102 has steadily been in the condition where tube V7 is non-conductive so that capacitor 33 is charged to a relatively high positive voltage, then upon the switching of the device 102 to the state where tube V7 is conductive, the capacitor 33 is able to discharge only through resistor 39. Thus, the lapse of time between the reversal of the device 102 and the subsequent actuation of relay RV in response to the changed conditions i.e. a vehicle now present and cutting off ground reflections, is determined entirely by the time constant for the discharge circuit of capacitor 33 which includes the resistor 39. Similarly, from the description previously given, it will be recalled that when relay RV was picked up, by reason of tube V7 having been conductive for some particular interval, then the restoration of tube V7 to its non-conductive state does not restore the normal high charge upon capacitor 33, but rather this capacitor now has the opportunity to be charged through the front contact 32 and resistor 35. The lapse of time that then results between restoration of tube V7 to its non-conductive state and the dropping away of relay RV is entirely dependent upon the time constant provided for the charging of capacitor 33 through resistor 35.

When the system is to be used in the detection and counting of vehicles in a garage, these charging and discharging time constants can be made relatively large since vehicle speeds are rather low and the use of the longer time constant provides the advantage that differentiation between the desired vehicles to be counted and other extraneous objects is enhanced. Where the device is to be used for the detection of vehicles on a highway, these time constants can be somewhat reduced, thereby insuring that the charge on capacitor 33 can quickly be reduced upon the passage of a vehicle and thereby cause relay RV to pick up and can likewise be also quickly restored to the normal high value, thereby insuring that relay RV will drop away between successive vehicles. As mentioned, such adjustments do tend somewhat to reduce the system's ability to discriminate against extraneous objects such as people, for example, but it is assumed that the highway unit would ordinarily be placed well away from the normal flow of pedestrian traffic.

The operation of the various gates and relay circuits just discussed results in the detection of highway vehicles, the differentiation of these vehicles on the basis of height, and the maintenance of a separate count for each differentiated group of vehicles passing through the detection zone.

While the examples of the invention described herein have dealt solely with vehicle detection by means of ultrasonic energy pulses beamed vertically downward, it should be obvious that this invention can be used to detect, differentiate, and count other objects capable of reflecting ultrasonic energy, and that the transducers shown can be placed to beam their pulses at any angle. The normal "ground" reflection utilized throughout this disclosure can be obtained at any other angle of transducer transmission merely by placing a solid reflecting surface behind the objects to be detected and perpendicular to the direction of the transducer's beamed transmissions.

In short, having described two specific embodiments of the present invention, it should be understood that these forms have been selected to facilitate in the disclosure of the invention rather than to limit the number of forms which it may assume. It is to be further understood that various modifications, adaptations and alterations may be applied to the specific forms shown to meet the requirements of practice, without in any manner departing from the spirit or scope of the present invention.

What I claim is:

1. Apparatus for counting vehicles as each passes through a detection zone defined by a beam of repetitive energy pulses which impinge upon the energy reflecting surfaces of said vehicle when it is within said detection zone but impinge instead when said vehicle is not within said detection zone upon a more distant fixed energy reflective surface, the combination comprising: transmitting means for transmitting said pulses, receiving means including a transducer responsive both to reflections of said pulses from said vehicle and from said fixed reflective surface, means electrically coupled to said receiving means for producing a first output signal for each received vehicle reflection pulse and a different second output signal for each received reflection pulse from said fixed reflective surface, binary means governed by said first and second output signals and being at substantially each instant in one or the other of its two conditions dependent upon whether said first or said second output signal has been the last to occur, registration means controlled by said binary means and being operable to a vehicle registering condition when said binary means has been in said one condition for at least a predetermined time which substantially exceeds the period of said transmitted pulses and being operable to its non-registering condition when said binary means has been in said other condition for at least a predetermined time which substantially exceeds the period of said transmitted pulses, and counting means responsive to said registering means to count said vehicles passing through said detection zone individually only if said registration means is operated to its said one condition and back to its said other condition for each such vehicle.

2. The apparatus of claim 1 wherein said registration means includes means for preventing operation of said registration means from either of its conditions to the opposite condition when said binary means rapidly alternates between its opposite conditions at times when reflection pulses are received concurrently from both said vehicle and said more distant reflective surface.

3. A vehicle registering system comprising in combination, means for transmitting a beam of repetitive energy pulses across the path of said vehicle so as to impinge upon its energy reflecting surfaces as it intercepts said beam but with said pulses impinging instead upon a more distant fixed energy reflecting surface only when said vehicle is not within said beam, receiving means including a transducer positioned to receive reflections of said energy pulses both from said vehicle and alternatively from said fixed reflecting surface but at times receiving reflections of energy concurrently from said vehicle and from said fixed reflecting surface particularly at times when said vehicle is entering and leaving said beam, responsive means electrically coupled to said receiving means and producing a first output signal for each reflection pulse received from said vehicle and a different second output signal for each reflection pulse received from said fixed reflecting surface, binary means coupled to said responsive means and being substantially at each instant in its first or second conditions according to whether the last-occurring output of said responsive means is said first or second output signal respectively, and output means governed by said binary means and being in a vehicle registering condition only when said binary means has been in said first condition for a predetermined time which is in excess of the maximum interval between the transmitted energy pulses, whereby vehicle registration occurs only if vehicle reflection pulses are received repeatedly but reflection pulses from said fixed reflecting surface are concurrently not received.

4. A vehicle counting system comprising in combination, transmitting means for transmitting repetitive pulses of energy across the path of said vehicles so as to impinge thereon when said vehicle is present but with said pulses impinging when no vehicle is present upon a more distant fixed reflective surface, receiving means differently responsive to reflection pulses from said vehicle and reflection pulses from said more distant reflecting surface respectively, quick-acting bistable state means governed by said receiving means and being operated to a first condition when a vehicle reflection pulse is received by said receiving means and being operated to a second different condition when a reflection pulse from said fixed reflective surface is received by said receiving means but being operated alternately between its opposite conditions when both vehicle reflection pulses and reflection pulses from said fixed reflective surface are received, registration means including slow-acting binary means governed by said quick-acting bistable state means and being operated to one condition when said bistable state means has been in its first condition for a predetermined time interval which substantially exceeds the period of said pulses and being operated to another condition when said bistable state means has been in its second condition for a time substantially exceeding the period of said pulses but not being operated from either condition to the other when said bistable state means alternates rapidly between its opposite conditions as it responds to both vehicle reflection pulses and reflection pulses from said fixed reflective surface, and counting means controlled by said registration means and being advanced a single count for each of a succession of vehicles intercepting said beam only provided that said registration means is operated to said one condition and then restored to its said another condition for each vehicle.

5. In a system for registering the presence of an object as it passes through a detection zone defined by a beam of energy which is directed toward and impinges upon said object when it is within said zone, transmitting means for directing said beam of energy toward said object, fixed means upon which said transmitted energy can impinge only when said object is not within said detection zone, receiving means including a transducer positioned on the same side of said fixed means as said transmitting means, said fixed means directing energy toward said transducer only when it receives energy from said transmitting means, said receiving means ordinarily receiving energy from said fixed means when no object is in said detection zone so that said fixed means has said beam impinging thereon but instead receiving energy reflected from said object when it is within said detection zone, signal generating means connected to said receiving means and producing a distinctive first signal only when said receiving means receives reflected energy from said vehicle and producing a distinctive second signal only when said receiving means receives energy from said fixed means, quick-acting bistable state means governed by said signal generating means and being operated alternatively to its first or second stable state according to whether said first or second signal is being generated by said signal generating means respectively but being operated alternately between its stable states rapidly when said receiving means concurrently receives both reflected energy from said vehicle and energy from said fixed means thereby causing said first and second signals to be generated concurrently by said signal generating means, and registration means including slow-acting binary means governed by said quick-acting bistable state means and being operated to one condition when said bistable state means has been in its first condition for a predetermined time interval substantially exceeding the period of said pulses and being operated to another condition when said bistable state means has been in its second condition for a time substantially exceeding the period of said pulses but not being operated from either condition to the other when said bistable state means alternates rapidly between its oppoiste conditions as it responds to both vehicle reflection pulses and reflection pulses from said fixed reflective surface.

6. The system of claim 5 in which said beam of energy comprises repetitive sound pulses, said fixed means is a sound reflecting surface which reflects each sound pulse impinging thereon when no object is in said detection zone, and said signal generating means includes time gating means demarcating first and second time intervals encompassing respectively the expected reception times of reflection pulses from said object and from said fixed means, said signal generating means producing said first output signal in response to a reflection pulse received during said first interval and producing said second output signal in response to a reflection pulse received during said second interval.

7. The combination of claim 3 wherein said binary device generates alternatively a low and a high voltage dependent upon whether said device is in its first or second states respectively, said output means comprising a capacitor electrically coupled to said binary device and responsive to the voltage generated by said binary device and also a circuit element being selectively operable to either of two distinctive conditions in accordance with the level of voltage to which said capacitor is charged to thereby register the presence of said vehicle.

8. The combination of claim 7 wherein said circuit element is a two-position electromagnetic relay being operated to a first condition when said capacitor is charged to a high voltage and being operated to a second condition when said capacitor is charged to a low voltage, said relay in its first condition providing a short time constant coupling for said capacitor to said binary device and also a long time constant discharging circuit for said capacitor, said relay in its second condition providing a short time constant coupling for said capacitor to said binary device and also a long time constant charging circuit for said capacitor, whereby rapid alternations of said binary device between its stable states as when reflections are received both from said device to be detected and said fixed surface are not effective to cause said relay to be operated from its last operated condition.

9. The combination according to claim 8 wherein said short time constant coupling for said capacitor comprises a rectifier in the low resistance forward direction from said binary device to said capacitor, and said short time coupling comprises a rectifier with its low resistance forward direction in the circuit from said capacitor to said binary device.

10. The combination according to claim 1 wherein said registration means comprises a storage capacitor and an associated electromagnetic relay with said capacitor being charged to one predetermined level of voltage to thereby cause the associated relay to be actuated to one distinctive position when said binary means has for at least a predetermined interval been in its one state, said capacitor being charged to a second predetermined voltage level to thereby cause the associated relay to be actuated to its other distinctive position when said binary means has been for at least a predetermined interval in the other of its stable states.

11. The combination according to claim 10 wherein said binary circuit means comprises an electronic flip-flop circuit providing a steady output voltage of one level to said storage capacitor when in one of its stable states and a steady output voltage of a different level to said storage capacitor when in the other of its stable states.

References Cited in the file of this patent

UNITED STATES PATENTS

| | | |
|---|---|---|
| 2,403,527 | Hershberger | July 9, 1946 |
| 2,594,276 | Barker | Apr. 29, 1952 |
| 2,622,140 | Muller | Dec. 16, 1952 |
| 2,695,956 | Mallinckrodt | Nov. 30, 1954 |
| 2,725,467 | Atwood | Nov. 29, 1955 |
| 2,794,974 | Bagno | June 4, 1957 |
| 2,866,600 | Cooper et al. | Dec. 30, 1958 |